United States Patent [19]
Doner

[11] Patent Number: 5,974,323
[45] Date of Patent: Oct. 26, 1999

[54] FREQUENCY PLAN FOR WIRELESS COMMUNICATION SYSTEM THAT ACCOMMODATES DEMAND GROWTH TO HIGH EFFICIENCY REUSE FACTORS

[75] Inventor: John R. Doner, Merritt Island, Fla.

[73] Assignee: AirNet Communications Corporation, Melbourne, Fla.

[21] Appl. No.: 08/749,600

[22] Filed: Sep. 13, 1996

[51] Int. Cl.$^6$ ..................................................... H04Q 7/36
[52] U.S. Cl. ............................................................. 455/447
[58] Field of Search ............................ 455/447; 370/328

[56] References Cited

U.S. PATENT DOCUMENTS

| | | | |
|---|---|---|---|
| 5,073,971 | 12/1991 | Schaeffer | 455/447 |
| 5,152,003 | 9/1992 | Poch | 455/447 |
| 5,483,667 | 1/1996 | Faruque | 455/447 |
| 5,734,983 | 3/1998 | Faruque | 455/447 |

*Primary Examiner*—Andrew M. Dollnar
*Attorney, Agent, or Firm*—Farkas & Manelli PLLC; Russell O. Paige

[57] ABSTRACT

A frequency allocation plan for a wireless communication system that accommodates growth in demand from a low density reuse pattern of twelve cells to a high efficiency reuse pattern of three cells. The available radio spectrum is first divided into three ranges and each range is further divided into four groups. The frequencies in each range are sequentially assigned to the four groups, and the groups are further identified as even and/or odd index groups. The twelve cell groups are laid out in rectangular shapes of four cells across by three cells high, with a first set of three cells in the upper left portion being assigned to use a first even index frequency group. A second group of three cells in a lower left portion are assigned to use a second even index frequency group. A third and fourth group of three cells associated with upper right and lower right positions are assigned the first and second odd index frequency group. As traffic density increases the cells are split into six sectors with each sector being assigned the other odd or even frequency group to achieve a reuse factor of six. Sectorizing to a cell reuse pattern of three is then implemented by swapping the resulting frequency assignments made to a leftmost column of three cells with a non-adjacent center column of a cell group to the left. In order to implement times three reuse in the rightmost column of cells, odd and even frequency assignments are similarly swapped between the leftmost column and the non-adjacent center column of the cell group to the right.

5 Claims, 12 Drawing Sheets

FREQUENCY PLAN FOR WIRELESS COMMUNICATION SYSTEM THAT ACCOMMODATES DEMAND GROWTH TO HIGH EFFICIENCY REUSE FACTORS

FIELD OF THE INVENTION

This invention relates to a method of operating a wireless communication system such as a cellular mobile radio system and more specifically to a technique for frequency allocation that accommodates growth in demand to permit the implementation of highly efficient frequency reuse plans.

BACKGROUND OF THE INVENTION

The demand for wireless communication services, such as cellular mobile telephone (CMT), digital cellular network (DCN), personal communication services (PCS) and the like, requires the operators of such systems to make maximum effective use of the available radio frequency bandwidth. Consider that the system operator must serve an ever increasing number of users in a given geographic territory, while having been allocated only a certain amount of radio spectrum that affords the ability to transmit and receive on only a limited number of radio channels.

In a conventional cellular system, links between the mobile stations and base stations are created using narrowband radio channels. In an effort to make the best use of the allocated radio spectrum, the geographic territory is then divided into a number of sub-areas, called cells. The radio channels are then allocated to the cells such that the amount of interference is minimal and such that capacity is maximized. This is typically accomplished by reusing the same channels within multiple cells located a minimum distance from one another. This distance, called the reuse distance, is determined such that the interference between adjacent base stations is minimal.

Even with this extensive frequency planning, however, service providers are finding that they cannot keep up with the demand for new cellular services, which in some areas has experienced annual growth rates of fifty percent (50%) or more. As such, numerous techniques continue to be proposed to increase cellular mobile telephone system capacity.

One such highly efficient technique was described in a co-pending U.S. patent application Ser. No. 08/331,455 filed by John Doner on Oct. 31, 1994, now U.S. Pat No. 5,649,292 entitled "A Method for Obtaining Times One Frequency Reuse in Communication Systems" and assigned to AirNet Communications Corp., who is the assignee of this application. According to that arrangement, the cells are each split into six radial sectors and frequencies are assigned to the sectors in such a manner as to provide the ability to reuse each available frequency in every third cell. Although this so-called "N=3" reuse scheme is highly efficient, it is not always cost effective. Specifically, it requires at least two complete sets of multichannel transceiver equipment either in the form of sets of multiple individual transceivers or as a broadband transceiver system (BTS) to be located in each cell. Because such multichannel transceiver equipment may end up costing several hundred thousand dollars to deploy, when such a system first comes on line or at other places in the system where the demand is relatively low, it may not be possible to justify the cost of deploying such complex equipment.

Because only a few cells at high expected demand locations will originally require the build out of sectorized cells and on broadband transceiver equipment, one might think that it would be relatively easy to deploy such cells of immediate high demand, and then upgrade the equipment as cell traffic increases. However, this is not as simple as it might seem at first glance. First, low density reuse patterns are typically implemented using a reuse factor of seven, and thus the reuse patterns do not fit well into a reuse grid of three because seven is not divisible by three. Even if the low density reuse pattern is selected to be a multiple of three, such as six, nine or twelve, mixing the N=3 cell patterns with N=6 or N=12 patterns creates unacceptable interference between homologous cells at the periphery of the cell patterns of a particular reuse factor, especially where one attempts to locate a sectorized cell adjacent to an un-sectorized cell.

DESCRIPTION OF THE INVENTION

Objects of the Invention

It is an object of this invention to provide a frequency planning scheme whereby a range of frequency reuse densities can be deployed to permit cost efficient initial system build out that allows migration to a high capacity system.

Another object is to provide such a system in which hardware deployment cost may be driven strictly on a per cell demand basis.

A further object is to provide an upgrading scheme for a cellular system which minimizes radio frequency interference problems among cells located along a boundary between high density use and low density use.

SUMMARY OF THE INVENTION

Briefly, the invention is a radio frequency assignment technique for a wireless communication system in which, as the system is first built out, a particular cell reuse factor, N, of twelve is used together with omnidirectional antennas and narrowband radio equipment. The particular N=12 reuse pattern is not ideal in the sense that it uses non-uniform spacing between homologous cells. However, the N=12 pattern does support upgrading to higher reuse densities on a cell by cell basis.

The particular twelve cell reuse pattern assigns frequencies to cells as follows. The available radio spectrum is first divided into three ranges, a lower (A), middle (B), and upper (C) range. The radio channels in each range are then further sequentially assigned to one of four groups. The four groups in each range are also identified with an index number (0,1,2, or 3) to permit further identification of the four groups as a pair of even index groups (groups 0 and 2) and a pair of odd index groups (groups 1 and 3). A total of twelve frequency groups are thus identifiable (A0, A1, A2, A3, B0, B1, B2, B3, C0, C1, C2, and C3).

Radio frequencies are then assigned to groups of twelve cells, considering that a group of twelve cells is laid out in an approximately rectangular shape of four cells across by three cells high. A first group of three cells in the upper left portion of the group are each assigned to use the first even indexed frequency group in each range (e.g. A0, B0 and C0). The second group of three cells in the lower left portion are assigned to use the second even indexed frequency groups (A2, B2 and C2). The third group of cells in the upper right portion are assigned the first odd indexed frequencies (A1, B1, and C1), and the fourth group of cells to the second odd indexed frequencies (A3, B3 and C3).

As demand requires, specific cells are then individually upgraded. In a first level upgrade, a cell is split into six sectors and broadband radio equipment may be introduced. Frequency assignments are doubled in the sectorized cell by using a union of frequency sets corresponding to either the even or odd indexed pair in each range. For example, if the cell was using set A0 previously, set A2 is then assigned to be used with set A0 in the six sectored arrangement.

In this improved level of frequency reuse, an N=6 pattern with the six sectored cells is thus eventually introduced but without the densest possible frequency packing. This increases the number of radio links which may be supported by a factor of two.

In a highest level of frequency reuse density, the available number of radio links in each cell is doubled again. This is accomplished by implementing N=3 reuse by assigning the logical union of the frequency sets deployed in the N=6 reuse configuration.

The twelve cell pattern is grouped into the sets

A odd=A1∪A3
A even=A0∪A2
B odd=B1∪B3
B even=B0∪B2
C odd=C1∪C3
C even=C1∪C2, and these sets are then assigned to alternate sectors of a three-cell pattern as follows:

Cell 1—A odd and C even,
Cell 2—C odd and B even,
Cell 3—B odd and A even.

As conversions are made to N=3, the cell being converted and the nearby co-channel cells must adhere to the channel assignment scheme, as described in the aforementioned patent, in order that an acceptable signal to interference (S/I) level be maintained in all cells.

As the groups of twelve cells must each be converted to the N=3 plan in full, this is accomplished by reassigning the frequencies in the three cells along the left and right edge columns of the twelve cell group to the frequencies originally used in the non-adjacent center column, and vice versa. This avoids a problem which would otherwise occur with adjacent cells having to use the same frequency.

BRIEF DESCRIPTION OF THE DRAWINGS

For a more complete understanding of the invention and its novel advantages and features, please refer to the accompanying drawings in which.

DETAILED DESCRIPTION OF A PREFERRED EMBODIMENT

Figure 1:
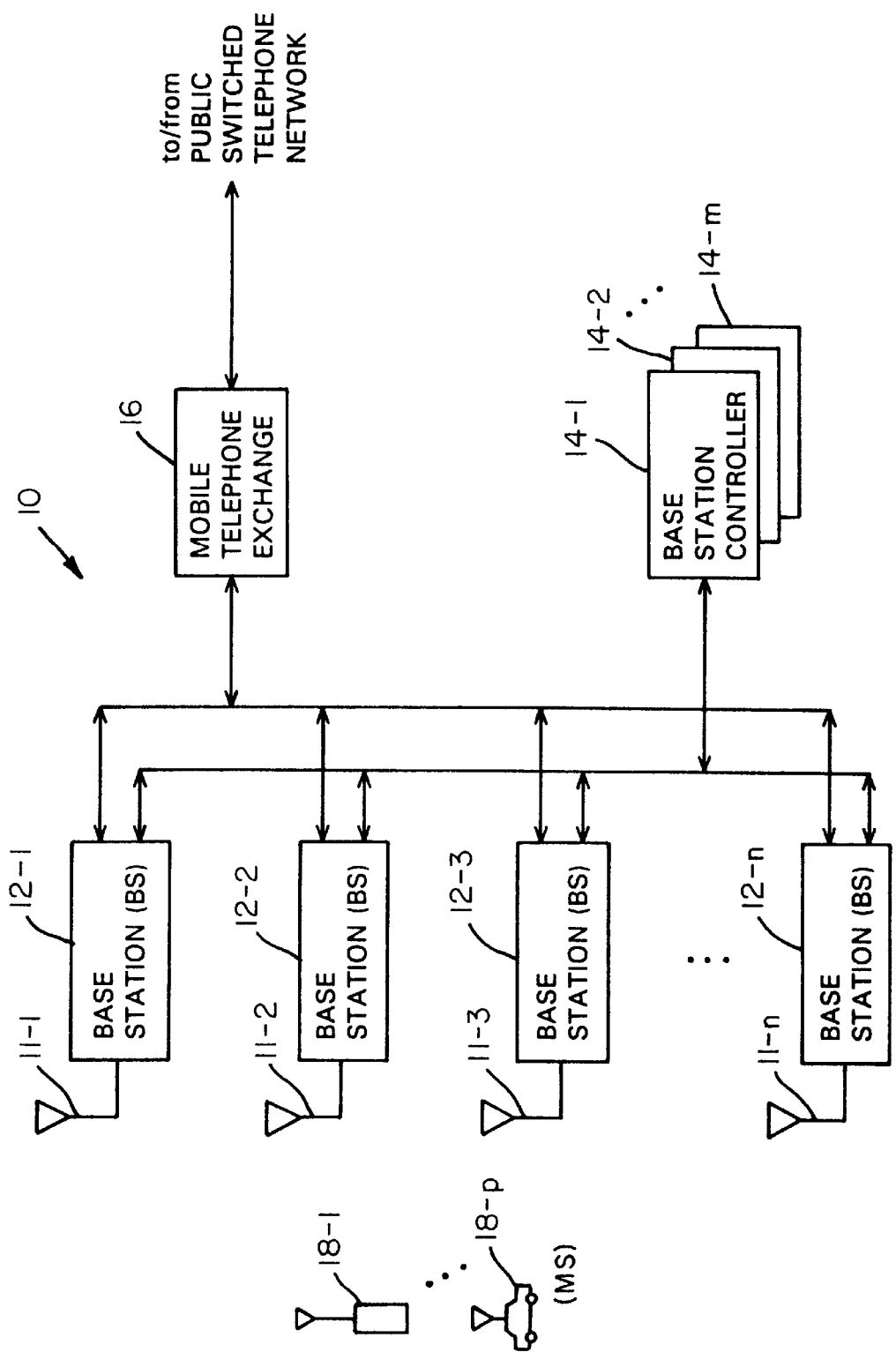
FIG. 1 is a block diagram of a broadband wireless communication system in which the invention may be used.

FIG. 1 is a block diagram of the components of a wireless system such as a Personal Communication System (PCS) or similar cellular system in which a frequency reuse pattern according to invention is implemented. The system 10 includes antennas 11-1,11-2, . . . , 11-n, base stations 12-1, 12-2, . . . , 12-n, base station controllers 14-1, 14-2, . . . , 14-m, a mobile telephone exchange 16, and mobile stations 18-1, 18-2, . . . ,18-p.

The system 10 supports voice and/or data communication between the mobile stations 18 and the public switch telephone network (PSTN) by sending signals over radio frequencies. In the particular embodiment of the invention being described, the radio signaling protocol, or "air interface" in use is the PCS-1900 standard promulgated by the Telecommunications Industry Association (TIA) in the United States {which is identical in relevant aspects to the Global System for Mobile Communication (GSM) promulgated in Europe by the European Telecommunications Standards Institute (ETSI)}.

The base stations 12 are primarily responsible for demodulating the radio signals received over the air and connecting them to the PSTN through the mobile exchange 16. The base stations 12 also modulate signals received from the PSTN through the mobile exchange 16 for transmissions over the air to the mobile stations 18. Each base station 12 is typically located substantially in the center of a particular sub-area, or cell of the system 10.

The base station controllers 14 have a number of functions, the primary function being to manage connections between the mobiles 18 and the PSTN. In order to do so, the base station controllers 14 assign transmit and receive radio carrier frequencies to each individual mobile station 18 and base station 12. Typically, there are five to twenty base stations 12 serviced by a single base station controller 14.

The present invention is in the specific manner in which the base station controllers 14 assign carrier frequencies for use. The frequency assignments made by the base station controllers 14 are such that cells having high volume of use can be deployed using a maximum possible frequency reuse factor, N, such as three. At the same time, however, adjacent cells may be supported that have low volume, so that a minimum density reuse factor may be implemented. This permits a minimum amount of hardware to be deployed in the base stations 12 which service the low density cells.

The ensuing discussion will be by way of explaining the assignment of frequencies for the transmit direction (base to mobile); however, it should be understood that analogous assignments are made of frequencies in the receive direction (mobile to base).

Figure 2:
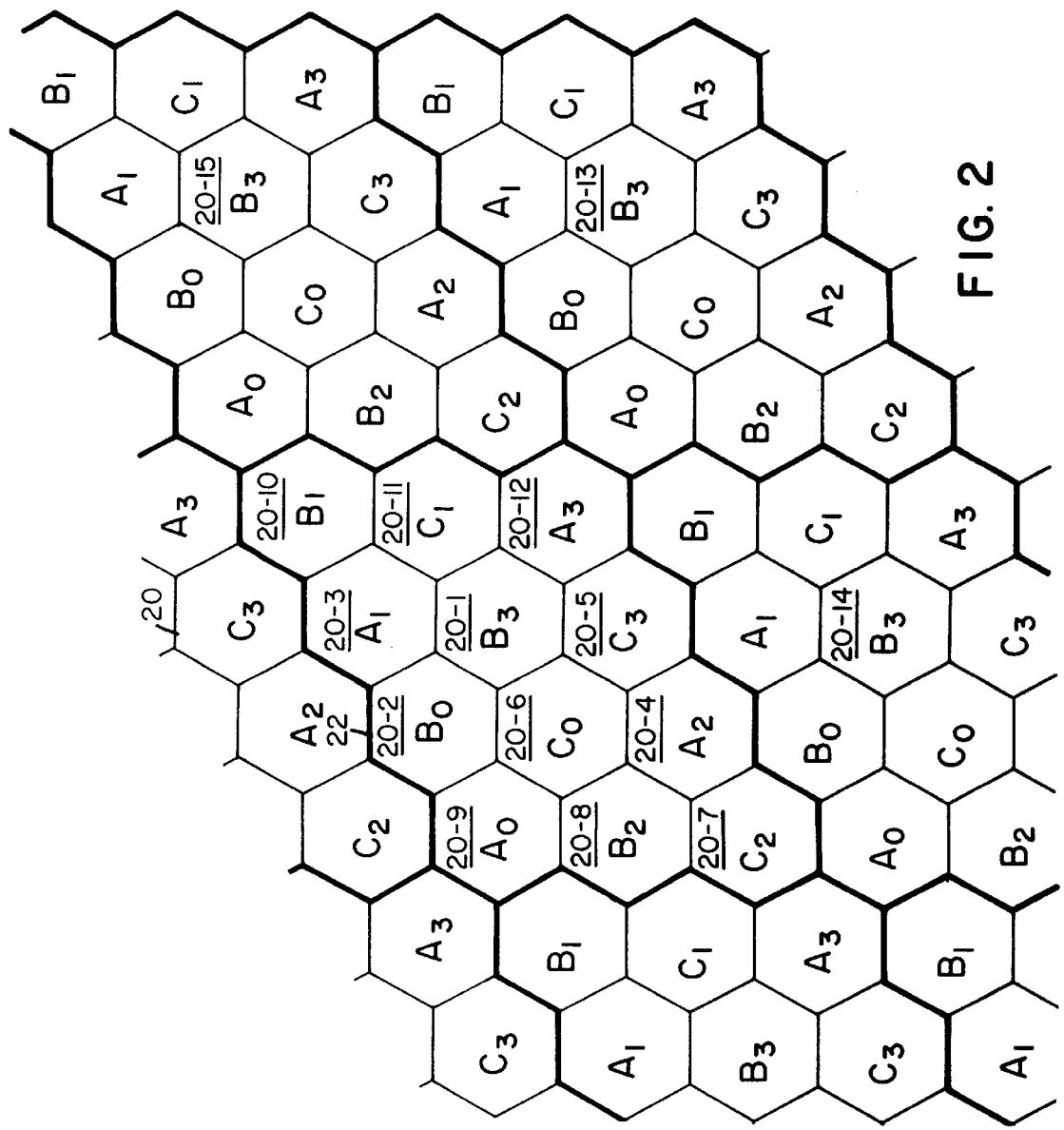
FIG. 2 diagrams a frequency plan which is implemented according to the invention in the early stages of system build out or where traffic densities are low, using a frequency reuse factor, N, equal to 12.

FIG. 2 shows the overall assignment of frequencies to cells in areas of low traffic density such as experienced at an initial build-out of the system 10. As illustrated, a given physical area over which the system 10 is to provide service is organized into hexagonal cells 20. Groups of frequencies are assigned by the base station controllers 14 to the individual cells 20. These cell group patterns are then repeated for the given number, N, of cells. In this case, the reuse is twelve.

In an initial stage of system deployment, these cell assignments are thus repeated for groups of twelve cells, such that an exemplary cell group 22 thus consists of cells, 20-1, 20-2, . . . , 20-12. Each cell thus has assigned to it approximately $1/N$, or $1/12$th, of the frequencies available to the operator of the system 10. These twelve frequency groups are labeled A0, A1, A2, A3, B0, B1, B2, B3, C0, C1, C2, and C3, and the reasons for this manner of labeling will be understood shortly. The frequency assignments to individual cells 20 are orthogonal to one another, that is, a given frequency is only used once in the twelve cells in a group 22.

The twelve frequency assignments are repeated to form patterns of like, or homologous, cells. For example, cell 20-1 is homologous to cells 20-13, 20-14 and 20-15, since each use the same frequency group, B3. The illustrated pattern is not an ideal twelve cell pattern in the sense that the distance between homologous cells is not uniform. That is to say, the distance between homologous cells 20-1 and 20-13 is not the same as the distance between cells 22-1 and 22-14; nor is it the same as the distance between cells 20-1 and 20-15. However, the pattern does provide a signal to interference (S/I) level well above the minimum normally required for adequate communications.

As will be described in detail below, the illustrated twelve cell pattern does lend itself to reconfiguration of each cell group 22 into progressively denser reuse factors, such as N=6 and N=3, without affecting the radio frequency interference level of adjacent cell groups 22 which may be implemented with less dense reuse factors.

Figure 3:
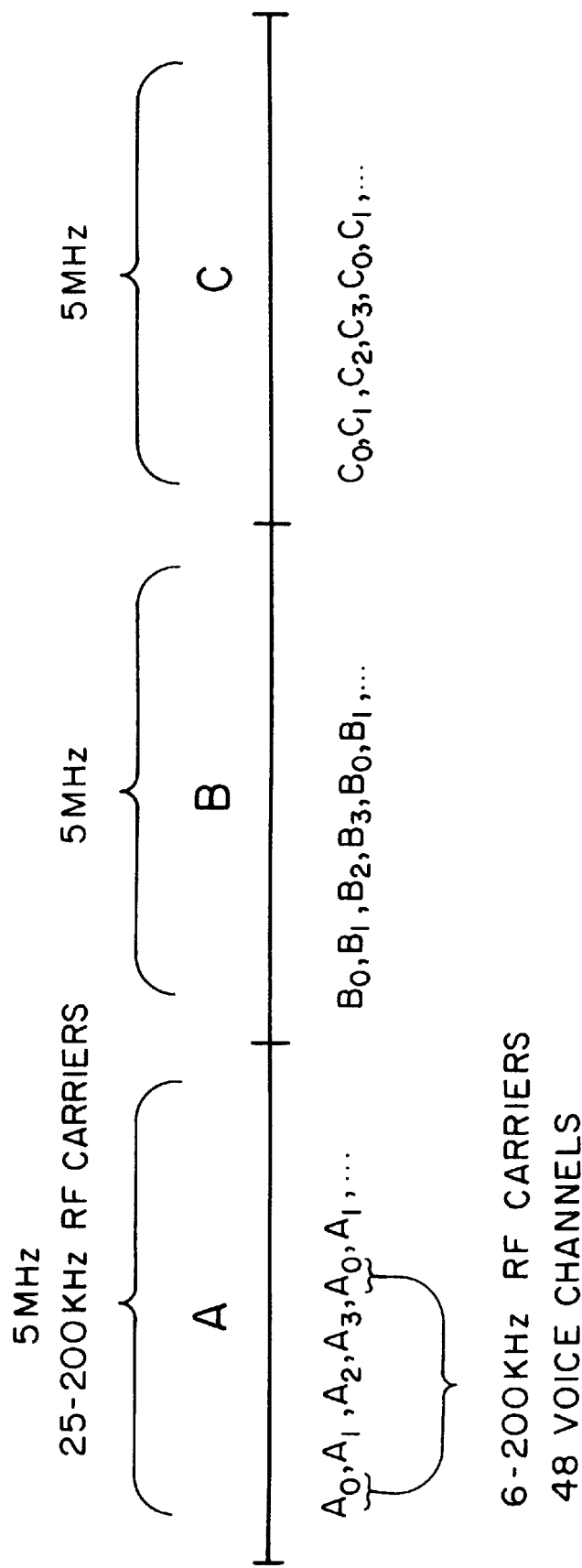
FIG. 3 illustrates the frequency bandwidth allocation typically made to a wireless services provider such as Personal Communication Services (PCS) and the manner in which the radio channels are assigned ranges and groups according to this invention.

To better understand how this is accomplished, refer briefly now to FIG. 3, which illustrates how the assignment of frequencies to the groups 22 is made. For the PCS 1900 type system described herein, the service provider may be assigned 15 MHz of bandwidth for transmitting signals, as the case may be. All radio carrier frequencies in this 15 MHz bandwidth are first assigned to one of three ranges. In the lowest 5 MHz of carrier frequencies, referred to herein as the "A" range carrier, frequencies are consecutively assigned labels A0, A1, A2, A3, A0, A1, . . . , and so forth as the carrier number increases. Since each radio channel in a PCS 1900 system has a 200 kHz bandwidth, there are 25 carriers in the lower 5 MHz. This results in six frequencies being assigned to each of the four resulting "A" groups, A0, A1, A2, A3, with a single "left over" carrier frequency.

In a PCS system, each 200 kHz carrier supports eight voice channel connections through time multiplexing, so that the total number of voice channels represented by the A0 group of carriers is forty-eight.

The "B" and "C" frequency ranges, representing the second and third 5 MHz of radio spectrum, are similarly arranged, such that six carrier frequencies are assigned to each of the groups B0, B1, B2, B3 and C0, C1, C2, C3.

The four groups in each range are thus also identifiable with an index number (0, 1, 2, or 3) to permit further identification of each group as one of a pair of even index groups (groups 0 and 2) or as one of a pair of odd index groups (groups 1 and 3).

Returning attention briefly to FIG. 2, consider the group 22 of twelve cells laid out in an approximately rectangular shape of four cells across by three cells high. A first sub-group of three cells 20-9, 20-2, 20-6 in the upper left portion of the group 22 are assigned to use the first even indexed frequency group in each range (A0, B0 and C0, respectively). A second sub-group of three cells, 20-4, 20-8, 20-7, in the lower left portion of group 22 are assigned to use the other even indexed frequency groups (A2, B2 and C2). The third sub-group of cells, 20-3, 20-10, 20-1 1, in the upper right portion are assigned the first odd indexed frequencies (A1, B1 and C1), and the fourth sub-group of cells, 20-12, 20-1, 20-5, to the second odd indexed frequencies (A3, B3 and C3).

Assignment of frequencies in a twelve cell pattern in this way results in using seventy-two of the seventy-five available PCS carriers. The three remaining carriers can each be unused once in cells of a given twelve cell group having higher demand. For example, if one of the cells 20-1 experiences an increase in traffic demand, then three extra carriers can be used in that cell without reconfiguration of the rest of the frequency plan with the group 22.

In the configuration of cells shown in FIG. 2, the system 10 as shown is in a state of relatively low overall demand, such as something less than 32 Erlangs per cell 20. In this case, the base station 12 hardware can be a fairly minimum implementation of a single narrowband transceiver in each cell 20.

Figure 4:
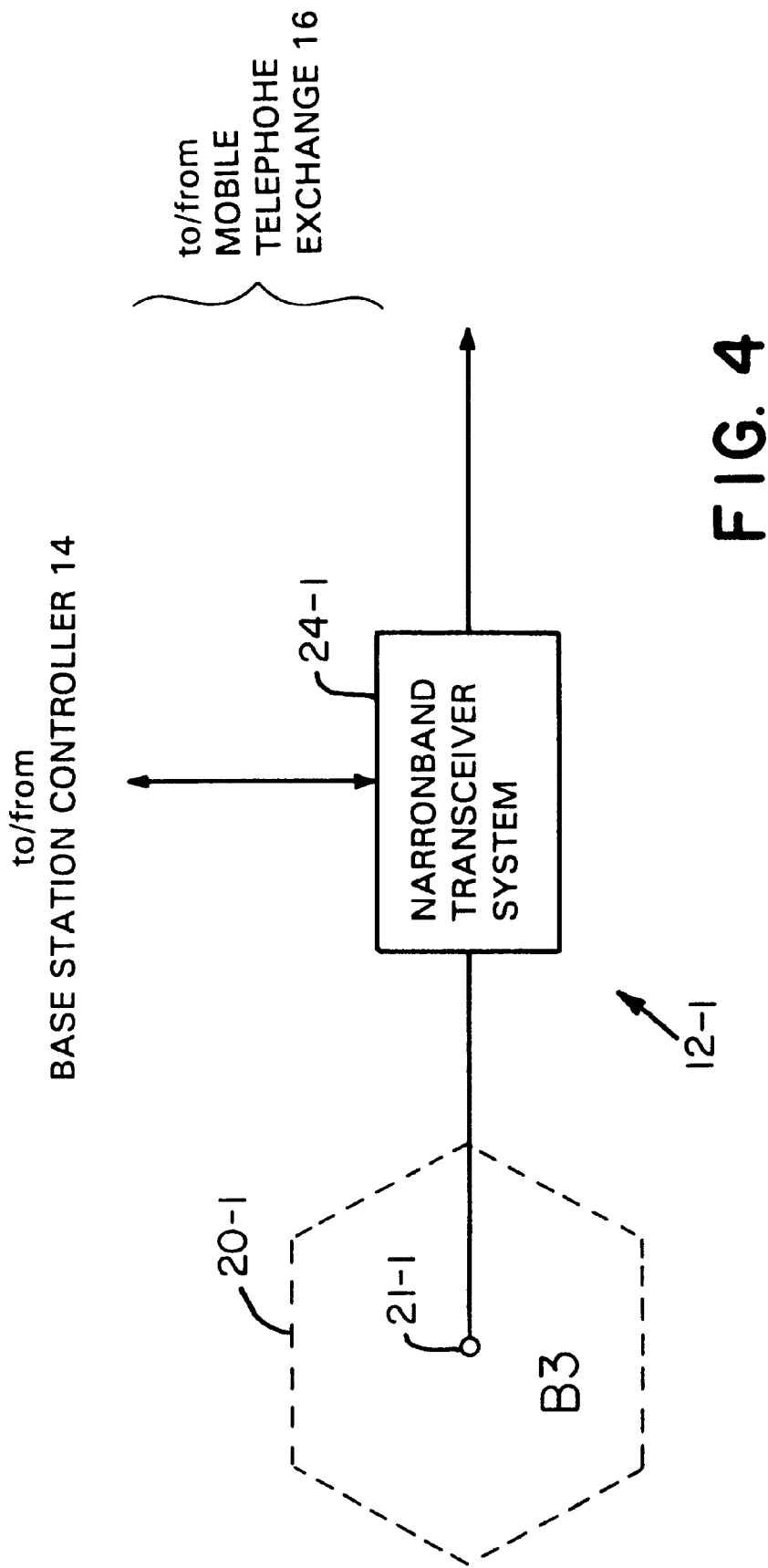
FIG. 4 is a block diagram of a base station portion of an exemplary cell site configured for low density traffic volume.

For example, as shown in FIG. 4, the base station 12-1 servicing cell 20-1 may thus typically be implemented initially with a minimum cost omnidirectional antenna 21-1 and single channel narrowband transceiver systems 24-1, and single carrier frequency from the six frequencies in group B3 can be assigned active status in the cell. As traffic density increases, additional narrowband transceivers 24 may be added as additional frequencies in group B3 are activated for use.

Figure 5:
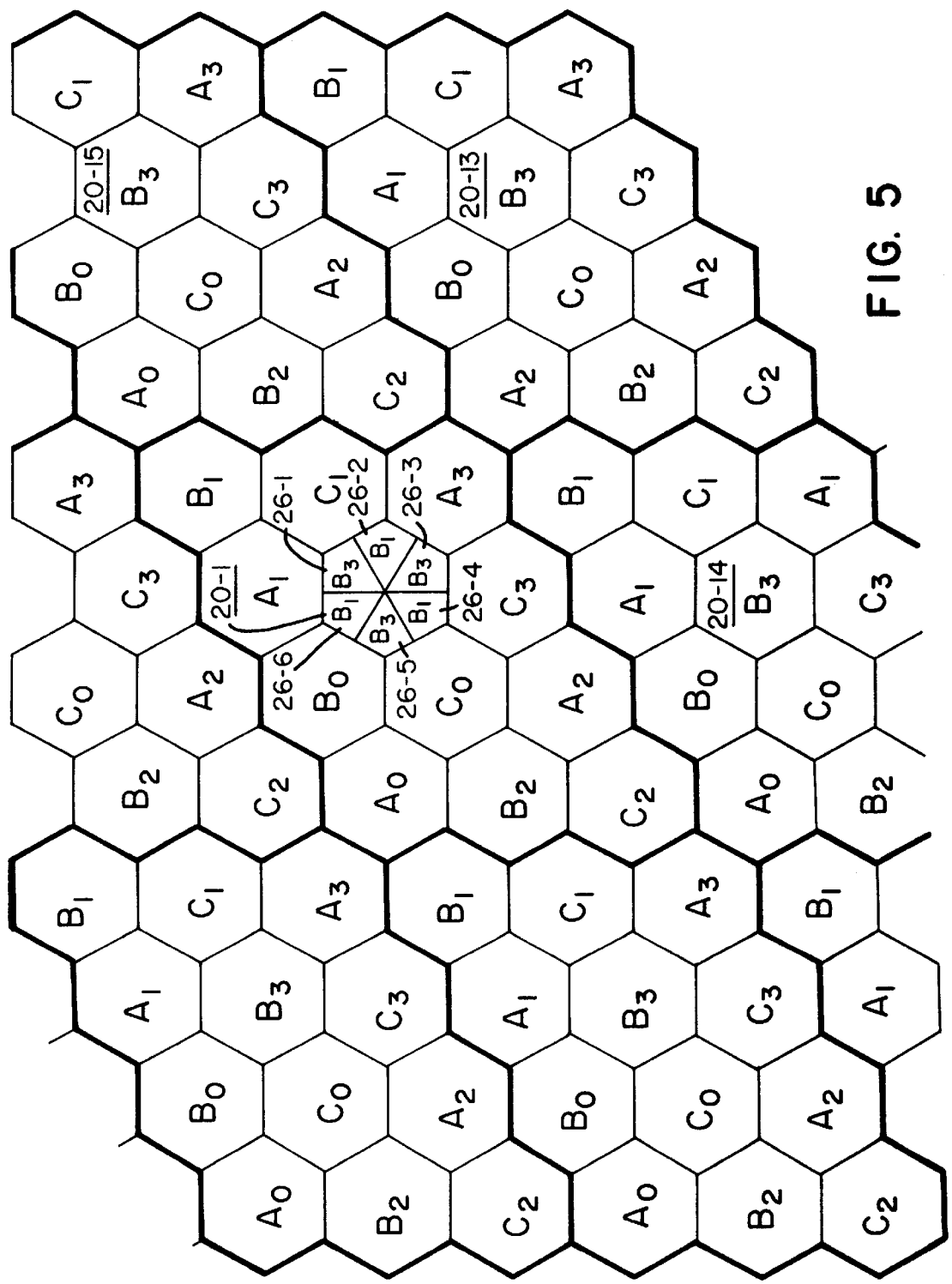
FIG. 5 is a frequency plan showing the frequency assignments made to implement an exemplary sectorized cell.

However at some point, the traffic density in cell 22 will exceed what can be accommodated with individual narrowband transceivers 24, which in the example being described, is the point at which the six available carriers in set B3 (which provide forty-eight voice channels) will have become insufficient to meet the number of expected simultaneous telephone calls in cell 20-1. To meet this increase in service demand on cell 20-1, the original N=12 reuse plan is then modified to accommodate a sectorized cell 20-1 as shown in FIG. 5. The cell 20-1 is thus split into six sectors, 26-1, 26-2, 26-3, 26-4, 26-5, 26-6, each consisting of a sixty degree (60°) radial arc. Two orthogonal frequency groups, such as groups B1 and B3, are assigned to the six sectors 26 in an alternating arrangement.

Figure 6:
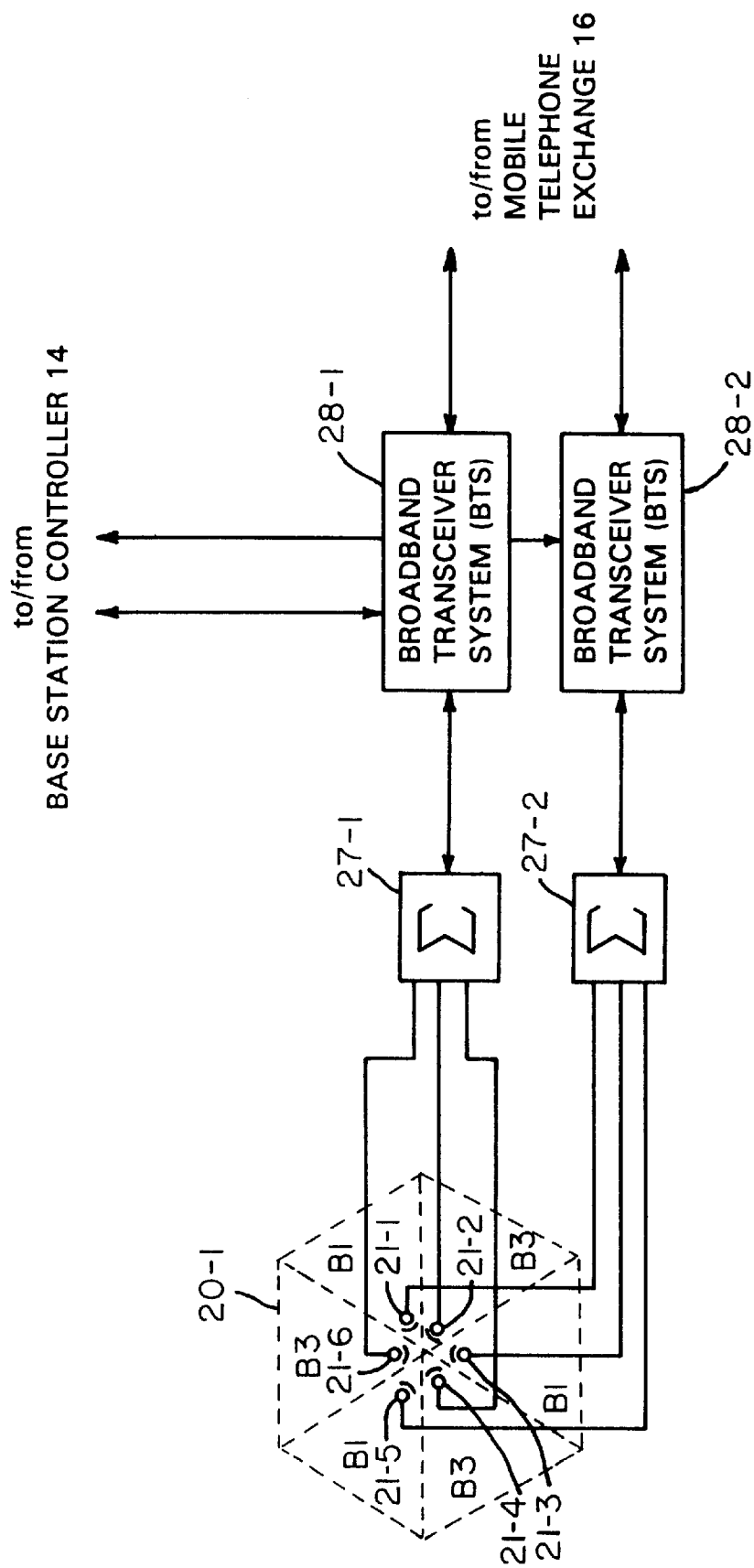
FIG. 6 is a block diagram of a base station and sector antennas as fully configured for maximum frequency reuse to accommodate high traffic volume.

More particularly now, as shown in FIG. 6, the six sector cell 20-1 is implemented using an array of six sectorized antennas 21-1, 21-2, 21-3, 21-4, 21-5, and 21-6 in which each sector antenna radiates into only a 60° arc of the cell 20-1. Each sector 26 has a second frequency group assigned to it that is the same as the frequency group assigned to the two other non-adjacent sectors in the cell 20-1. In the labeling convention followed here, the second frequency group is the other one of the odd or even indexed group in the same range (A, B, C). So, both "odd" indexed frequency groups B1 and B3 are thus assigned to cell 20-1. As a result, the reuse factor has been increased by a factor of two for cell 20-1, to N=6, and twice as many voice channels are now available for use.

The antenna couplings 21-1, 21-3 and 21-5 of the sectors 26 sharing the same frequency group, such as group B1, are then fed to a common broadband transceiver system (BTS) 28-1 through a combining network 27-1. Likewise, antennas 21-3, 21-4 and 21-6 are fed through a second combining network 27-2 to a second BTS 28-2. Each of the BTS's 28 is a broadband multichannel transceiver in that it is capable of transmitting and receiving on all of the 25 channels within the "B" frequency range simultaneously.

Even though the homologous cells 20-13, 20-14 and 20-15 (FIG. 5) are not sectored at the same time, the co-channel interference conditions will be nearly identical to or better than in a system that implements the full N=3 reuse configuration.

Further details of one embodiment of the broadband transceiver system 28 may be found in a published Patent Cooperation Treaty (PCT) patent application Serial No. US95/01045 published on Dec. 7, 1995.

Figure 7:
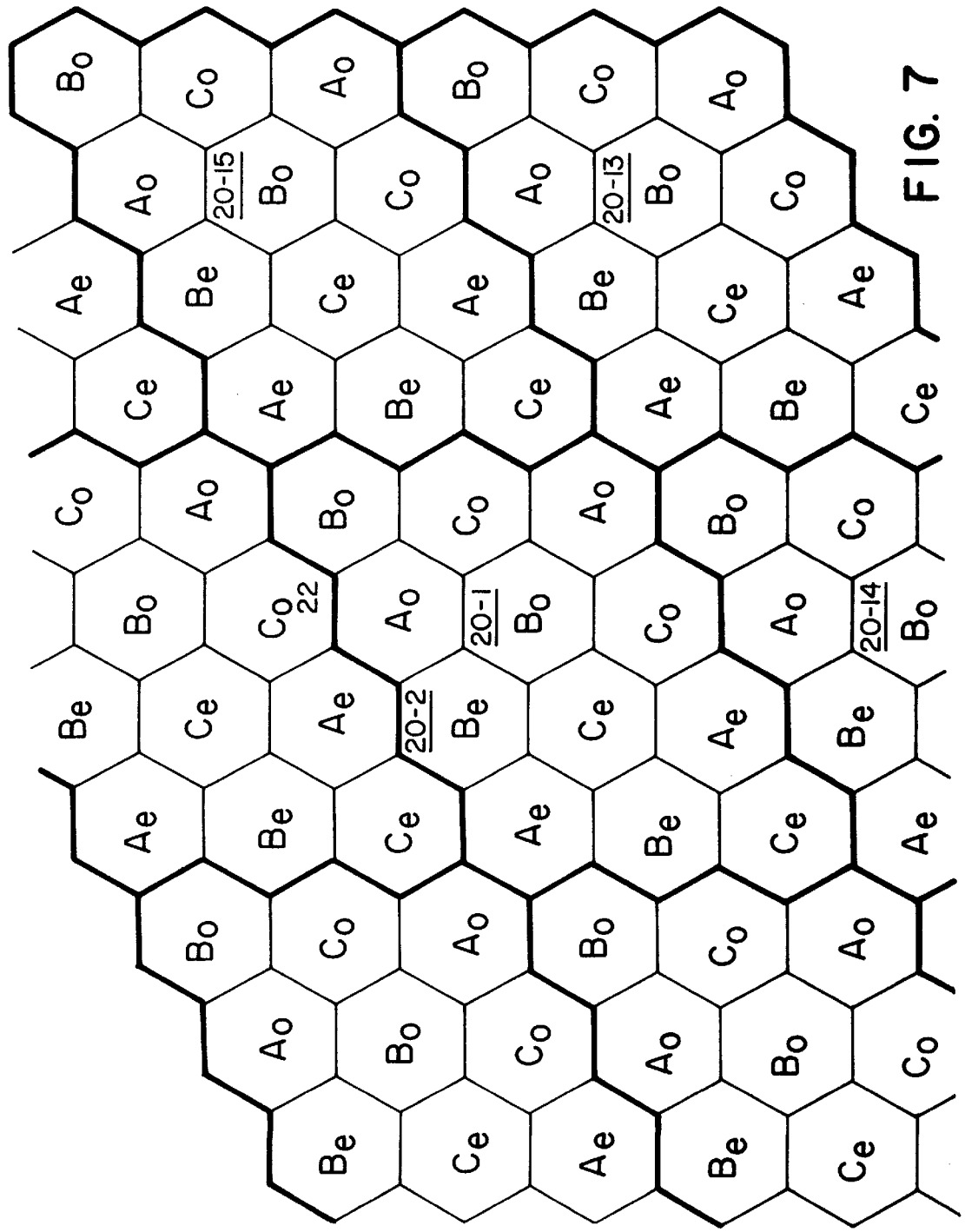
FIG. 7 is a frequency plan showing assignments of even and odd frequency groups to sectorized cells to achieve an overall reuse factor of six.

The cells 20 can continue to be individually converted in the manner shown in FIG. 5, from a N=12 density to an N=6 density, by sectorizing until the N=6 frequency reuse pattern is deployed in a relatively large number of contiguous cell groups 22, as shown in FIG. 7. For the sake of clarity in this and subsequent figures, the sectorization detail is not shown with the frequency group notation instead being altered. For example, cell 20-1 is still configured as was shown in FIG. 5, as a six sectored cell using frequency groups B1 and B3 but is labeled as "Bo". In FIG. 7, the notation Bo indicates that the odd numbered frequency groups B1 and B3 are deployed in a cell, and Be indicating that the even numbered frequency groups B0 and B2 are deployed. The frequency group notation used for FIG. 5 has thus been changed in FIG. 7 to be Ae=A0∪A2
Ao=A1∪A3
Be=B0∪B2
Bo=B1⊙B3
Ce=C0∪C2
Co=C1∪C3.

Figure 8:
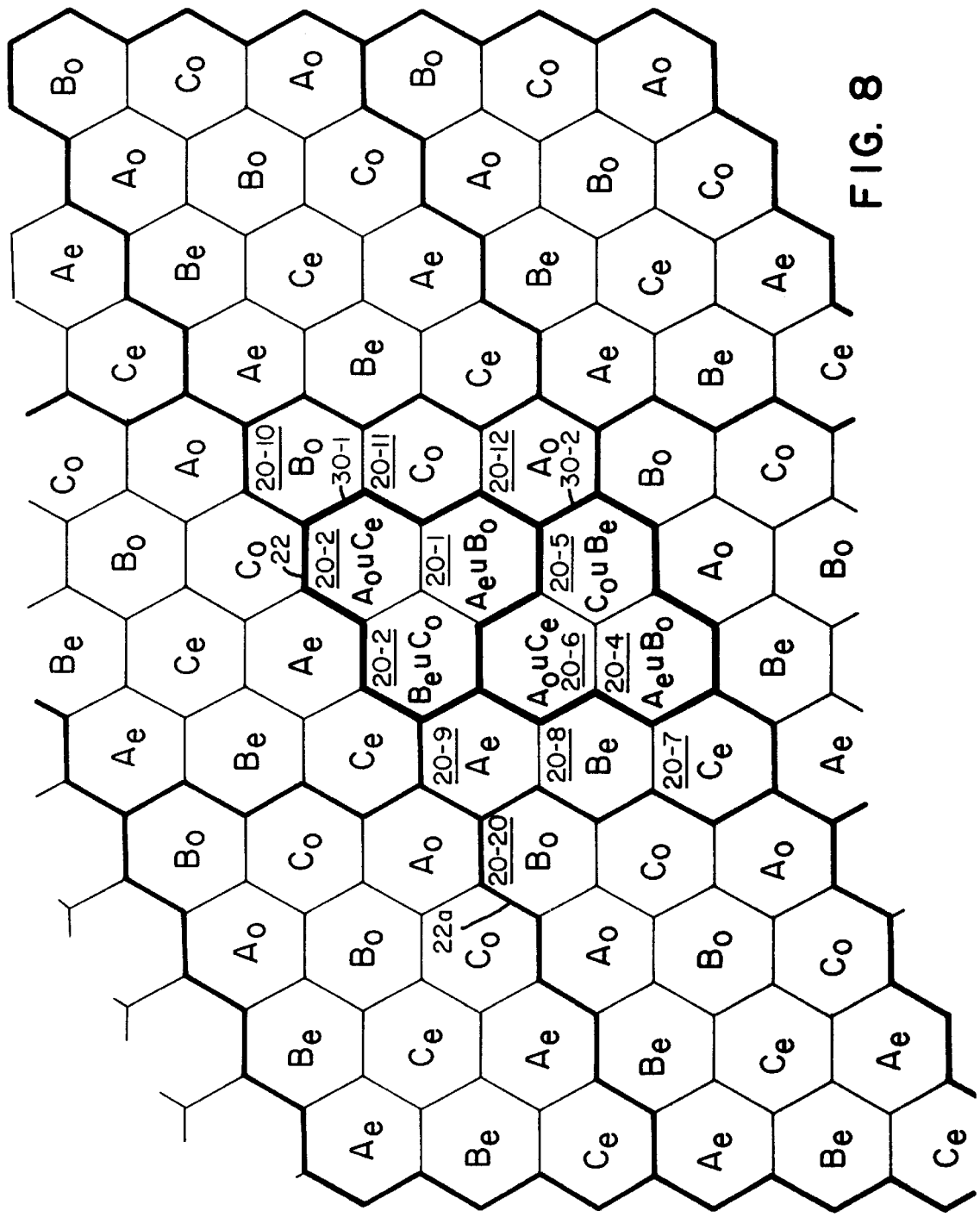
FIG. 8 is a frequency plan illustrating frequency assignments such that a reuse factor of three may be achieved for certain cells in the middle of a cell group.

Once this mid-level of cell density deployment has been made in a group 22, it can then be "cut-over" to provide a maximum density N=3 reuse as described in the co-pending patent application referred to above. As this scenario is beginning to be deployed, as shown in FIG. 8, the exemplary cell 20-1 is assigned frequencies taken from the set Ae∪Bo and its two neighboring cells 20-2 and 20-3 in the center of the group 22 are taken from the sets Be∪Co, and
Ao∪Ce, respectively.

Each cell 20 also requires deployment of two additional base transceiver systems 28 to cover the added frequency range. The six sector cell 20-1 then has two times as many frequencies available for use, thereby supporting as many as 192 voice channels in a PCS system, for example.

In this configuration, cells 20-1 and its two center neighbors 20-2 and 20-3 form an N=3 reuse sub-group 30-1 which fits completely within the original twelve cell group 22. The frequency assignments are also compatible with the surrounding N=6 patterns. That is to say, no cell in the sub group 30-1 uses a frequency group in a cell location which is adjacent to an N=6 cell using the same group. In other words, there is always at least a one cell spacing between cells using the same frequency.

The other cells located in the middle of the cell group 22, such as cells 20-4, 20-5, and 20-6, can similarly be cut-over to full N=3 reuse, forming their own subgroup 30-2 using frequency assignments Be∪Co
Ao∪Ce, and
Ae∪Bo respectively.

The spacing between homologous cells (that is, those cells using the same frequency group) remains exactly compatible with the full three cell reuse plan. As a result, the density increase to N=3 in subgroup 30-2 does not decrease the signal to interference ratio (S/I) to an unacceptable level in any adjacent cell.

Although this conversion of the six cells 20-1, 20-2, 20-3, 20-4, 20-5, 20-6 in the center of the twelve cell group 22 appears to have been straight forward, the cells 20-7, 20-8 and 20-9 at the left edge of the group 22 cannot be changed to three cell density in the same manner. To do so would require the reuse of the same frequency set in adjoining cells along the left hand border of the group 22 and the right hand border of group 22a. For example, cell 20-9 cannot simply be changed from using frequency set Ae to set Ae∪Bo (as was the case for cell 20-1) because a cell 20-20 in adjacent cell group 22a has already been assigned frequency set Bo in accordance with the N=6 reuse plan.

Figure 9:
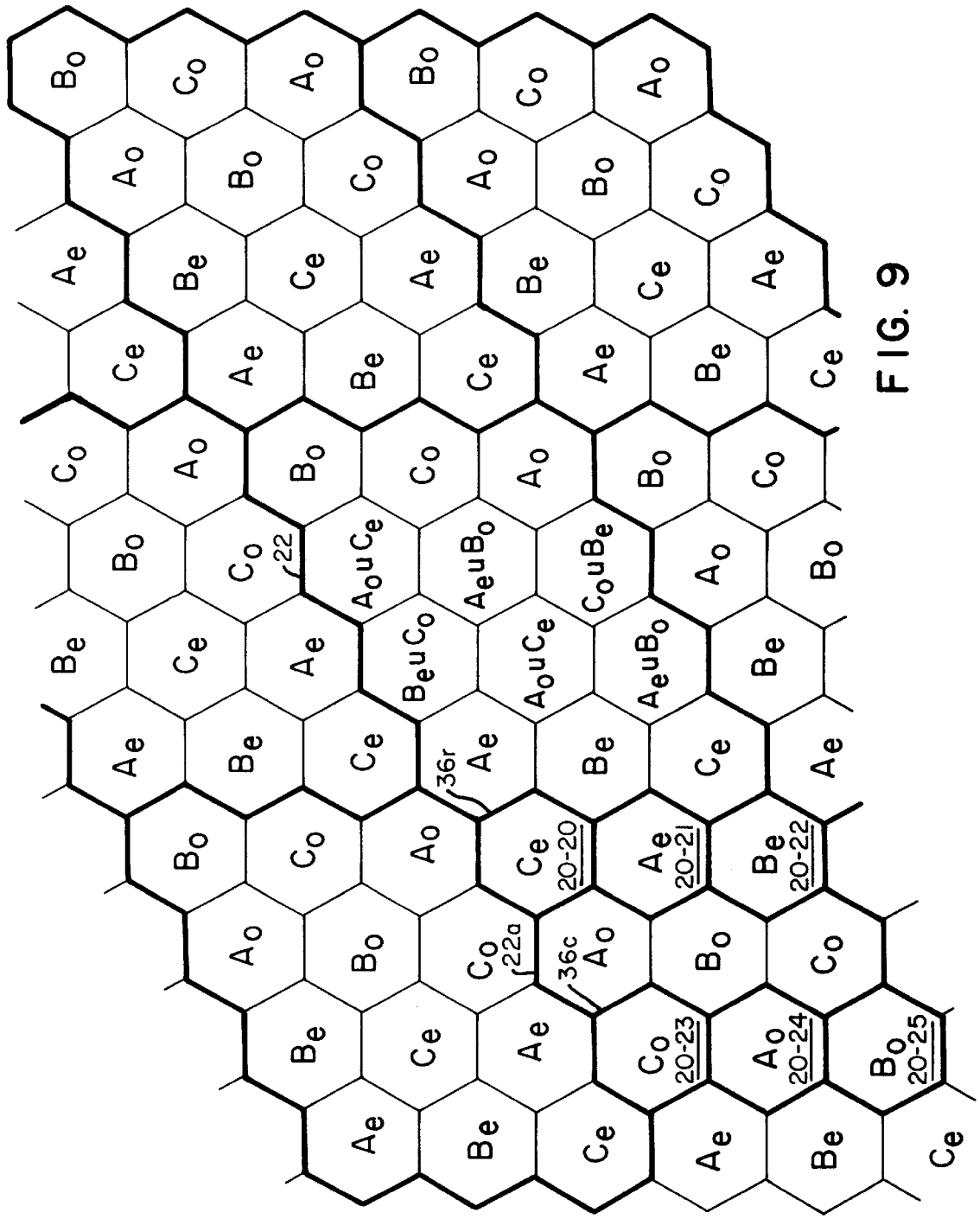
FIG. 9 is a frequency plan illustrating frequency re-assignments which are made prior to converting cells at a left edge of a cell group from N=6 to N=3 cells.

As shown in FIG. 9, however, this seeming impasse can be resolved by reassigning certain of the frequency groups in the cell group 22a, so that no cell is located adjacent to a cell using an homologous frequency set. In particular, a reassignment of frequency sets is made to the right most column of cells 36r in group 22a (cells 20-20, 20-21, 20-22). The reassignment is made by swapping the middle column 36c of cells (cells 20-23, 20-24, 20-25) which is one column removed from the right most column 36c. This leaves frequency sets Ce, Ae, and Be to be assigned to right most column 36r and the frequency sets Co, Ao, and Bo to be assigned to the center column 36c. This column swapping brings the even frequency groups Ae, Be and Ce into the right column 36r and odd frequency groups Ao, Bo and Co into the center column 36c.

Figure 10:
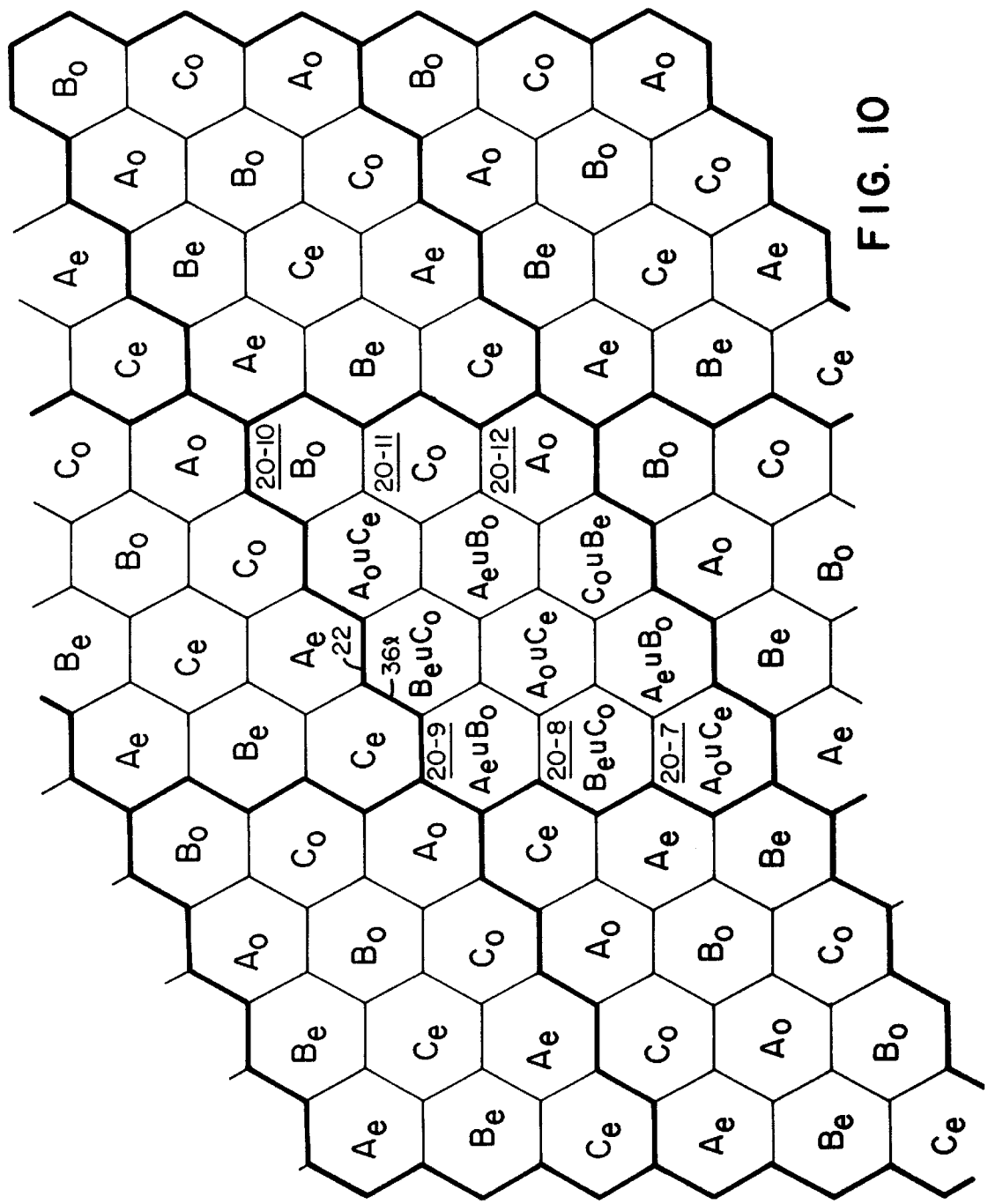
FIG. 10 is a frequency plan illustrating frequency assignments to cells along the left edge of the cell group to achieve N=3 in those cells.

As shown in FIG. 10, the frequencies assigned to the left most cells 20-7, 20-8, 20-9 in cell group 22 can now be assigned the proper frequency sets (respectively, Ao∪Ce, Be∪Co, Ae∪Bo) to convert them to full three cell reuse density.

Figure 11:
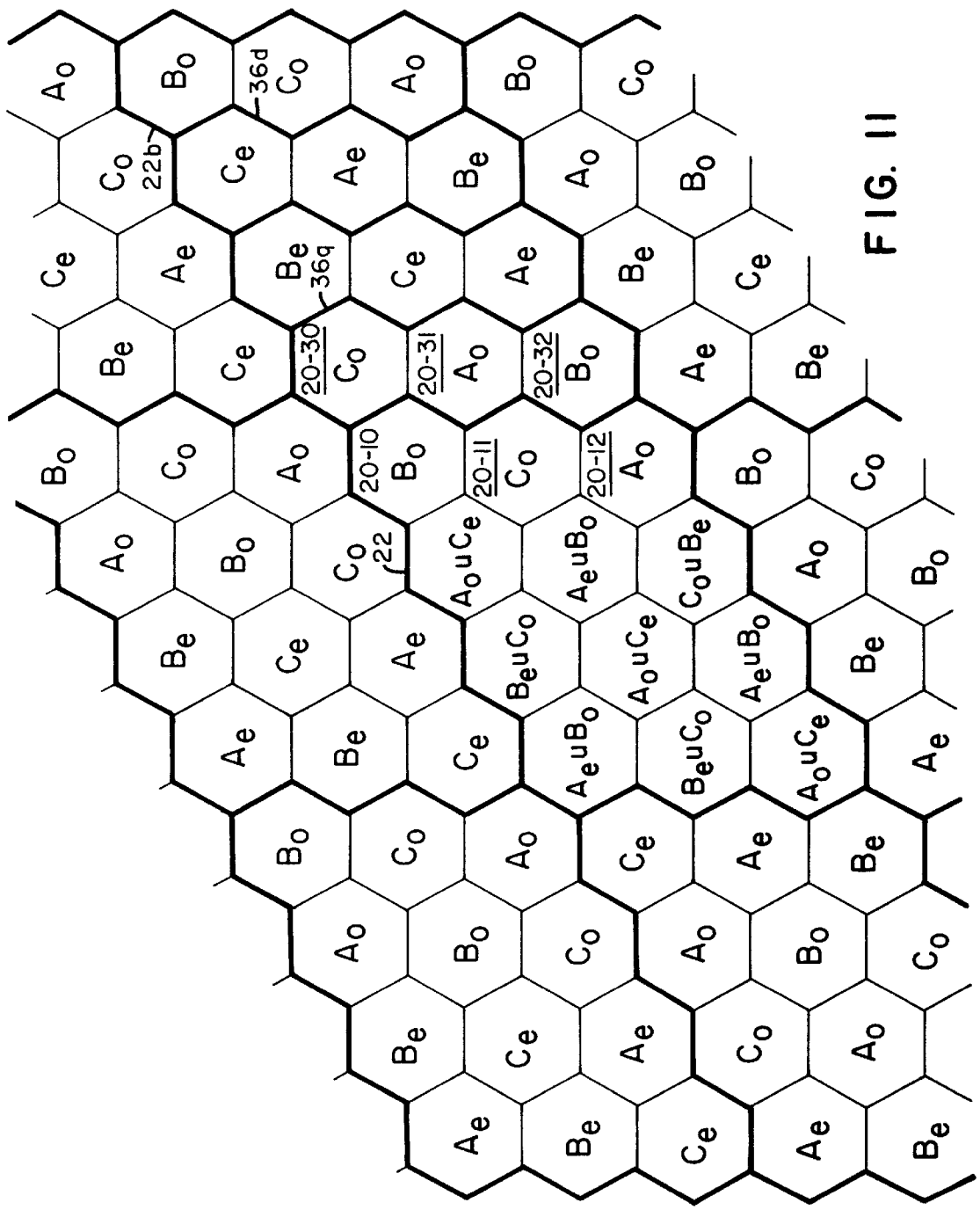
FIG. 11 is a frequency plan illustrating frequency re-assignments which are made prior to converting cells at a right edge of the cell group to reduce interference between the N=3 cells at the right edge and homologous N=6 cells located in a cell group to the right.

In order to convert cells 20-10, 20-11, 20-12 in the right most column of group 22, a similar reconfiguration is needed. Specifically, the three cells along the left most edge of cell group 22b to the right of cell 22 is also required. FIG. 11 illustrates this, with the three cells 20-10,20-11, 20-12 along the right most edge of group 22, and the manner of rearranging the frequencies assigned to the leftmost column 36q in cell group 22b. As for the instance of FIGS. 8 and 9, the odd frequency groups Co, Ao and Bo are swapped from the non-adjacent center column 36d and reassigned to cells 20-30, 20-31 and 20-32 of leftmost column 36q, and the even frequency groups Ae, Bc and Ce previously assigned to column 36q are deployed in the center column 36d. This now permits assignment of N=3 frequency groups Ae∪Bo, Be∪Co, and Ao∪Ce, respectively, to cells 20-10, 20-11, 20-12 in a manner such that no frequency group is reused in a cell of the leftmost column 36q of the group 22b.

Figure 12:
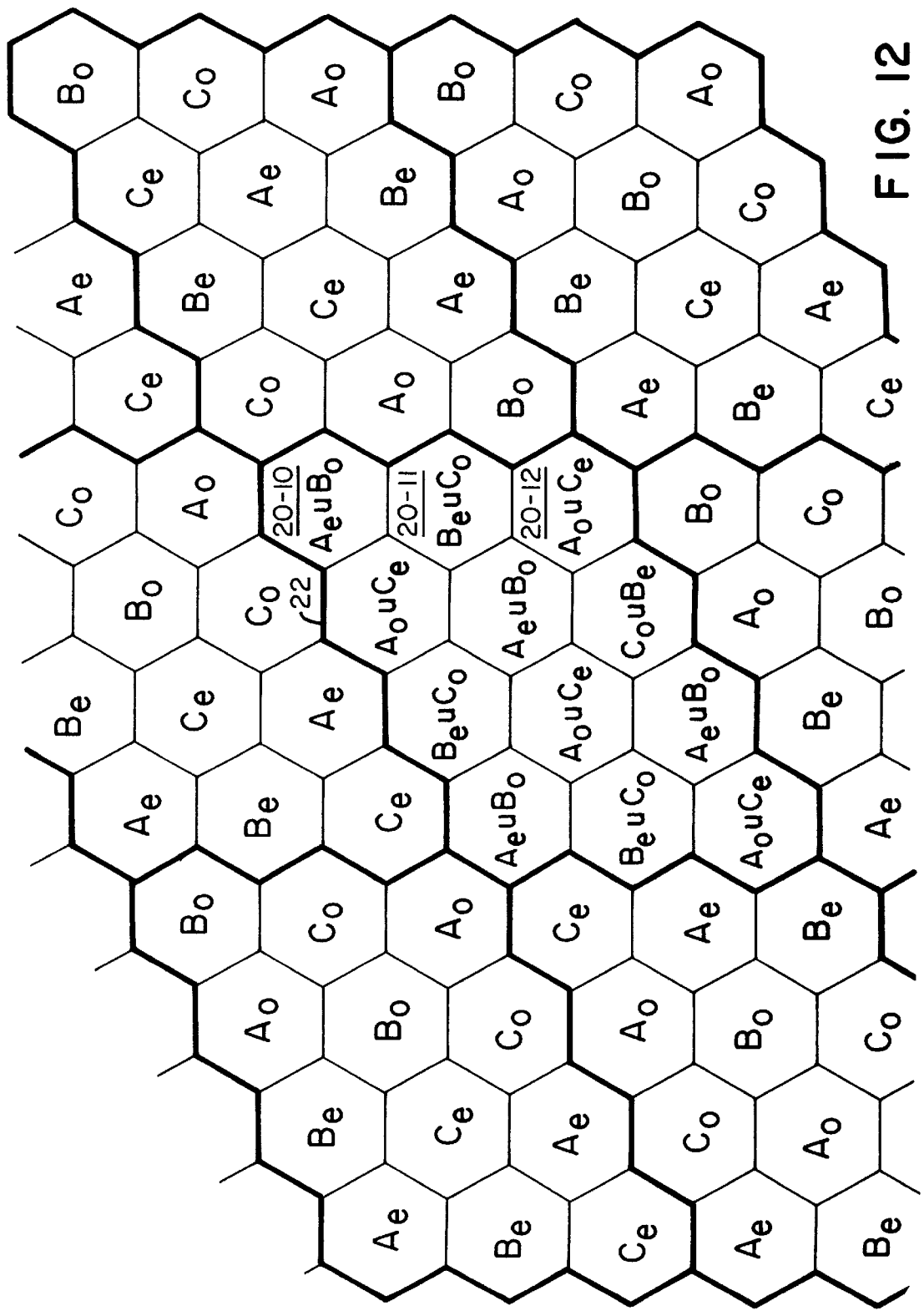
FIG. 12 is a frequency plan illustrating frequency assignments to cells along the right edge of the cell group to achieve N=3 in those cells and hence, for the entire twelve cell group.

As shown in FIG. 12, frequency assignments have thus now been made to all twelve cells in group 22 to provide the maximum reuse density of N=3.

Expansion of cells in the system to N=3 density can thus take place only as absolutely needed, with exactly as many or as few cells as necessary being converted to accommodate the demand in a given cell.

The original twelve cell frequency reuse deployment has thus permitted an optimum mix of twelve cell, six cell and three cell demand densities to be served within a single system, with hardware buildout cost being driven solely on a per cell basis.

What is claimed is:

1. A cellular communications system consisting of a plurality of cells, the plurality of cells being located substantially adjacent to one another, and the cellular communication system operating over a specified radio frequency range, the cellular communication system making use of a frequency allocation plan that arranges the cells into groups of twelve, with each of the twelve cells in a cell group having a unique group of carrier frequencies characterized in that that the carrier frequencies in each group are being assigned from the specified available radio frequency range by first dividing the radio frequency range into a lower (A), middle (B), and upper (C) frequency range, and with the radio channels in each range (A, B, C) being further identified by a sequential frequency index number (0, 1, 2, or 3) to permit further identification of each of the frequency groups as either an even index group or an odd index group, thereby providing a total of twelve identifiable frequency groups (A0, A1, A2, A3, B0, B1, B2, B3, C0, C1, C2, C3), and with the group of twelve cells being laid out in an approximately rectangular shape of four cells wide by three cells high, with a first group of three cells in an upper left portion of the twelve cell group being assigned to use the first even index frequency group in each range (A0, B0, C0), and with the second group of three cells in the lower left portion of the twelve cell group being assigned to use the second even index frequency group (A2, B2, C2), and with a third group of cells in an upper right portion of the twelve cell group being assigned to the first odd index frequency group(A1, B1, C1), and a fourth group of three cells in a lower right portion of the twelve cell group being assigned to use the second odd index frequency group (A3, B3, C3).

2. A cellular communications system as in claim 1, wherein at least one cell in the group of twelve cells contains six antennas centrally located in the cell and radiating into adjacent sixty-degree (60°) arcs of the cell, to thereby provide six sectors per cell additionally characterized in that uniform reuse of frequency groups is made to groups of six cells by selecting even or odd indexed frequency groups to be used in a given cell such that only the even or odd index frequency group are in use in any given cell, to thereby form sets of homologous cell repeating patterns of six, and such that the two frequency groups assigned in at least one of the homologous cells are made to alternate non-adjacent sectors in each cell such that no two adjacent sectors in the same cell are assigned the same frequency group.

3. A cellular communications system as in claim 2 additionally characterized by a frequency reuse pattern of three cells of said group of twelve cells, wherein a union of the set of first range, even frequency group and second range, odd frequency group (Ae∪Bo), is assigned to a first one of said three cells, a union of the second range, even frequency group and the third range odd frequency group (Be∪Co) is assigned to a second one of said three cells, and the union of the odd frequency first range group and even frequency, third range group (Ao∪Ce) is assigned to the third one of said three cells.

4. A cellular communication system as in claim 3, further characterized by a frequency reuse pattern of three implemented along a leftmost column of three cells in the twelve cell group (22) by exchanging frequency assignments made to a rightmost column (36r) of three cells in a second twelve cell group (22a) where said second twelve cell group is located to the left of the twelve cell group (22) with a non-adjacent center column (36c) of that same cell group (22a) located to the left of the twelve cell group.

5. A cellular communication system as in claim 3, further characterized by a frequency reuse pattern of three implemented in a rightmost column of three cells in the twelve cell group (22) by exchanging frequency assignments made to a leftmost column (36d) of three cells in a second twelve cell group (22b) where said second twelve cell group is located to the right of the twelve cell group (22) with a non-adjacent center column (36c) of a cell group (22b) located to the right of the twelve cell group (22).

* * * * *